United States Patent
Graham et al.

(10) Patent No.: US 9,145,923 B2
(45) Date of Patent: Sep. 29, 2015

(54) LOAD COUPLING FOR ADJUSTING TORSIONAL NATURAL FREQUENCY OF A POWER TRAIN

(71) Applicant: General Electric Company, Schenectady, NY (US)

(72) Inventors: Nicholas Simon Graham, Greenville, SC (US); Raymond Andrew Vincent, Fountain Inn, SC (US); Roberto Anthony Nunez, Greenville, SC (US); William Patrick Giffin, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 239 days.

(21) Appl. No.: 13/934,662

(22) Filed: Jul. 3, 2013

(65) Prior Publication Data
US 2015/0010347 A1 Jan. 8, 2015

(51) Int. Cl.
*F16D 1/033* (2006.01)
*F16D 1/02* (2006.01)
*B23Q 11/00* (2006.01)

(52) U.S. Cl.
CPC *F16D 1/02* (2013.01); *F16D 1/033* (2013.01); *B23B 2250/04* (2013.01); *B23Q 11/0035* (2013.01); *Y10T 403/645* (2015.01); *Y10T 464/50* (2015.01)

(58) Field of Classification Search
CPC ............ Y10T 403/642; Y10T 403/645; Y10T 464/50; F16D 1/02; F16D 1/033; F16D 1/076; B23B 2250/04; B23Q 11/0035
USPC .................. 74/572.2, 574.2, 572.21; 464/180
See application file for complete search history.

(56) References Cited

U.S. PATENT DOCUMENTS

| | | | | |
|---|---|---|---|---|
| 1,497,735 A | * | 6/1924 | Richardson | 74/571.11 |
| 2,679,414 A | * | 5/1954 | Hornschuch | 403/307 |
| 3,838,464 A | * | 9/1974 | Doyle | 360/137 |
| 4,721,445 A | * | 1/1988 | Hoffmann | 418/61.3 |
| 4,998,780 A | | 3/1991 | Eshler et al. | |
| 5,027,873 A | * | 7/1991 | Anselm | 144/224 |
| 5,033,923 A | * | 7/1991 | Osawa | 409/131 |
| 5,299,880 A | * | 4/1994 | Bouchard | 403/3 |
| 6,126,549 A | * | 10/2000 | Appell et al. | 464/24 |
| 6,186,712 B1 | * | 2/2001 | Senzaki | 409/234 |

(Continued)

FOREIGN PATENT DOCUMENTS

| | | |
|---|---|---|
| EP | 0460335 A1 | 12/1991 |
| EP | 0801236 A1 | 10/1997 |

*Primary Examiner* — Michael P Ferguson
*Assistant Examiner* — Matthew R McMahon
(74) *Attorney, Agent, or Firm* — Dority & Manning, PA

(57) ABSTRACT

A load coupling for adjusting torsional natural frequency of a power train includes a first flange having a plurality of annularly arranged connecting holes, a second flange having a plurality of annularly arranged connecting holes and a shaft that extends between the first flange and the second flange. A threaded bore hole is defined within one of the first flange or the second flange radially outward from the plurality of connecting holes. A first threaded plug is seated within the threaded bore hole. The first threaded plug includes a turning end that is axially separated from a contact end. A second threaded plug is seated within the threaded bore hole. The second threaded plug includes a turning end that is axially separated from a contact end. The contact end of the first threaded plug is axially loaded against the contact end of the second threaded plug.

11 Claims, 11 Drawing Sheets

(56) References Cited

U.S. PATENT DOCUMENTS

| | | | |
|---|---|---|---|
| 6,471,453 B1 * | 10/2002 | Winebrenner et al. | 409/141 |
| 6,688,802 B2 * | 2/2004 | Ross et al. | 403/337 |
| 7,284,460 B2 * | 10/2007 | Yamamoto | 74/573.1 |
| 8,186,955 B2 * | 5/2012 | Buskirk et al. | 416/145 |
| 8,319,380 B2 | 11/2012 | Singhal | |
| 2005/0089385 A1 | 4/2005 | Lin | |
| 2009/0041560 A1 | 2/2009 | Lunden | |
| 2010/0296893 A1 | 11/2010 | Dupiol | |
| 2012/0230798 A1 | 9/2012 | Sterle | |
| 2013/0071180 A1 | 3/2013 | Graham et al. | |

* cited by examiner

LOAD COUPLING FOR ADJUSTING TORSIONAL NATURAL FREQUENCY OF A POWER TRAIN

FIELD OF THE INVENTION

The present disclosure relates generally to power trains. In particular, the invention relates to an apparatus for adjusting torsional natural frequencies of a power train.

BACKGROUND OF THE INVENTION

Power trains typically consist of mechanical and electrical systems that generate and deliver power. An example of a power train is a turbine and generator that are coupled together via a load coupling. The turbine applies torque to the load coupling which transfers the torque to the generator to produce electrical power.

The power train has one or more natural frequencies which may be excited by torsional vibrations. The natural frequencies of the power train are dependent on the inertia of the power train. The inertia of the load coupling is a component of the inertia of the power train. Because the inertia of the load coupling affects the natural frequencies of the power train, the natural frequencies of the power train may be adjusted by changing the inertia of the load coupling.

Due to the large size and mass of some power trains such an industrial gas turbine or steam turbine and a generator used in a power generation powertrain, it is difficult to sufficiently modify the turbines and generators, particularly onsite, so as to shift the natural frequencies at which they vibrate after they have been installed. As a result, there is a long felt need to adjust the inertia and natural torsional frequencies of industrial power trains that does not require substantial changes to the turbines or generators.

Known approaches to adjusting the torsional natural frequencies of such power trains involve the use of additional masses arranged about the load coupling. However, many currently known approaches require deformation of the load coupling to retain these masses during operation. Deformation of the load coupling may result in irreversible damage to the load coupling and may limit the ability to fine tune the torsional natural frequencies of the power train. Damage to the load coupling may result in costly repairs and relatively long outage times while the load coupling is repaired and/or replaced. Accordingly, an apparatus for adjusting torsional natural frequencies of power trains which does not require deformation of the load coupling is desired in the art.

BRIEF DESCRIPTION OF THE INVENTION

Aspects and advantages of the invention will be set forth in part in the following description, or may be obvious from the description, or may be learned through practice of the invention.

In one embodiment, the present disclosure provides a load coupling. The load coupling includes a first flange that defines a plurality of annularly arranged connecting holes, a second flange that defines a plurality of annularly arranged connecting holes and a shaft that extends axially between the first flange and the second flange. A threaded bore hole is defined within one of the first flange or the second flange radially outward from the plurality of connecting holes. A first threaded plug is seated within the threaded bore hole. The first threaded plug includes a turning end that is axially separated from a contact end. A second threaded plug is seated within the threaded bore hole. The second threaded plug includes a turning end that is axially separated from a contact end. The contact end of the first threaded plug is axially loaded against the contact end of the second threaded plug so as to provide an axial preload between threads of the first and second threaded plugs and threads of the threaded bore hole.

In another embodiment, the present disclosure is directed to a load coupling. The load coupling includes a shaft having a first flange that extends radially outward from a first end of the shaft and a second flange that extends radially outward from a second end of the shaft. Each of the first flange and the second flange include a plurality of annularly arranged connecting holes. A threaded bore hole is defined within one of the first flange or the second flange radially outward from the plurality of connecting holes. A first threaded plug is seated within the threaded bore hole. The first threaded plug includes a turning end that is axially separated from a contact end. A second threaded plug is seated within the threaded bore hole. The second threaded plug includes a turning end that is axially separated from a contact end. An intermediate plug is disposed within the threaded bore hole between the respective contact ends of the first and second threaded plugs. The intermediate plug includes a first reaction surface and a second reaction surface. The contact end of the first threaded plug is axially loaded in one direction against the first reaction surface of the intermediate plug and the contact end of the second threaded plug is axially loaded against the second reaction surface of the intermediate plug in an opposite direction to preload threads of the first and second threaded plugs against threads of the threaded bore hole.

In another embodiment, the present disclosure is directed to a power train. The power train includes a torque producing power source that include a rotating connecting flange, a torque driven power load that includes a rotating connecting flange and a load coupling. The load coupling includes a shaft having a first flange that extends radially outward from a first end of the shaft and a second flange that extends radially outward from a second end of the shaft. Each of the first flange and the second flange include a plurality of annularly arranged connecting holes. A plurality of threaded bore holes is defined within one of the first flange or the second flange radially outward from the plurality of connecting holes. A first threaded plug and a second threaded plug are seated within one bore hole of the plurality of bore holes. Each threaded plug includes a turning end axially separated from a contact end. The contact end of the first threaded plug provides an axial force to the contact end of the second threaded plug so as to provide a preload between threads of the first and second threaded plugs and threads of the threaded bore hole.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
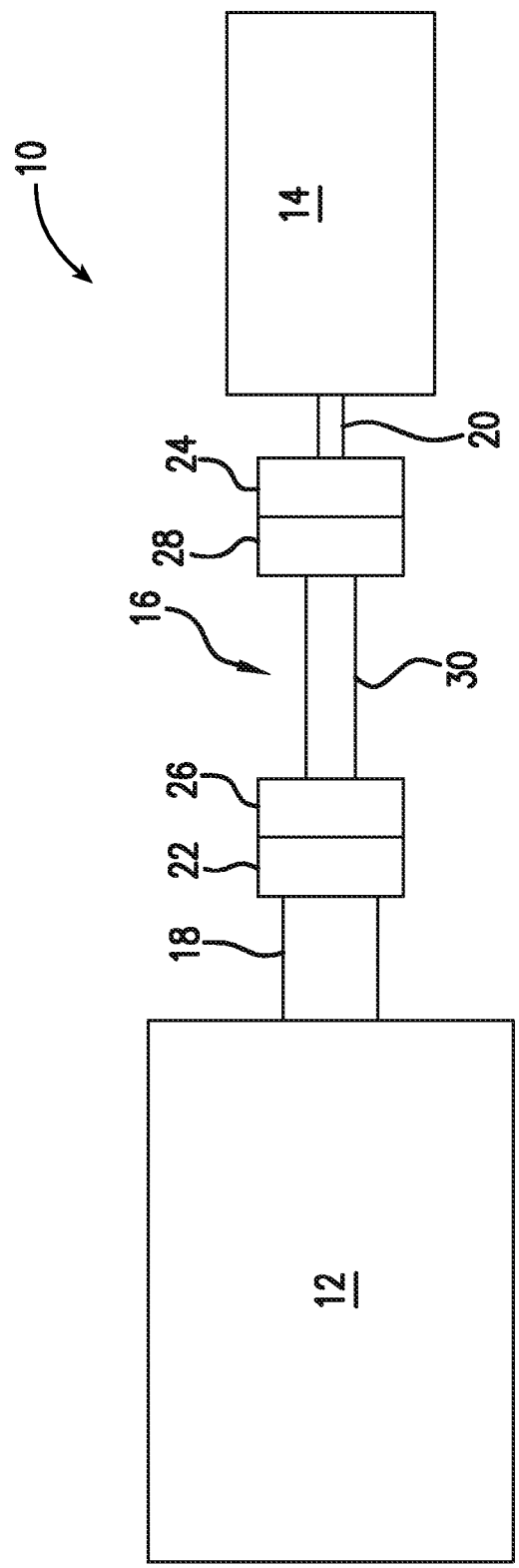
FIG. 1 is a schematic view of one embodiment of a conventional power train.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic illustration of a conventional power train 10. As shown, the power train 10 generally includes a torque producing device 12 such as a steam or gas turbine, a torque driven device 14 such as an electrical generator or a compressor and a load coupling 16 that extends between the torque producing device 12 and the torque driven device 14. In particular configurations, the torque producing device 12 and the torque driven device 14 each include a rotatable shaft 18, 20 and a connecting flange 22, 24 disposed at one end of the respective rotatable shaft 18, 20.

Figure 2:
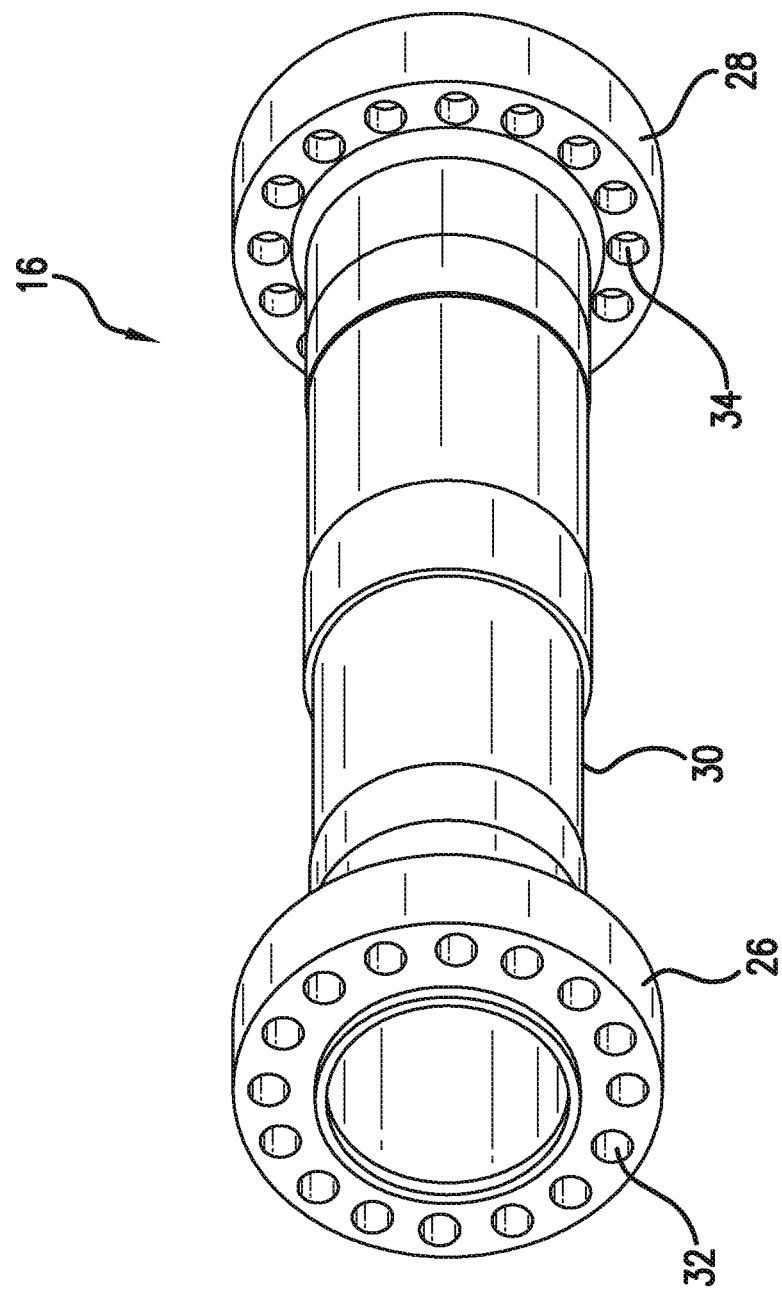
FIG. 2 is a perspective view of one embodiment of a conventional load coupling.

FIG. 2 provides a perspective view of a conventional load coupling 16 as illustrated in FIG. 1. As shown in FIGS. 1 and 2, the conventional load coupling 16 generally includes a pair of connecting flanges 26, 28 that are axially separated by a shaft 30. As shown in FIG. 2, each connecting flange 26, 28 includes a plurality of annularly arranged connecting holes 32, 34 for coupling the connecting flanges 26, 28 to the connecting flanges 22, 24 of the torque producing device 12 and the torque driven device 14 as shown in FIG. 1. In operation, the load coupling 16 transfers torque produced by the torque producing device 12 to the torque driven device 14.

Figure 3:
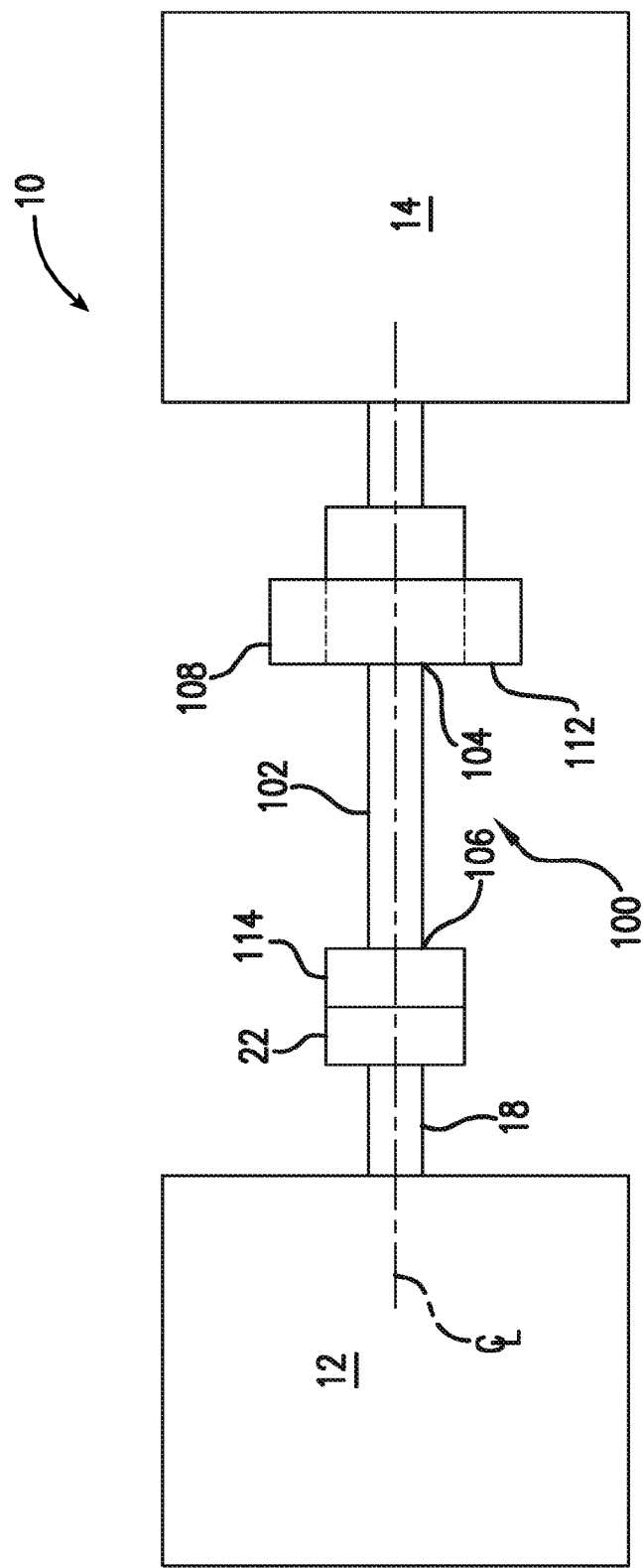
FIG. 3 is a schematic view of a power train in accordance with one embodiment of the present disclosure.
Figure 4:
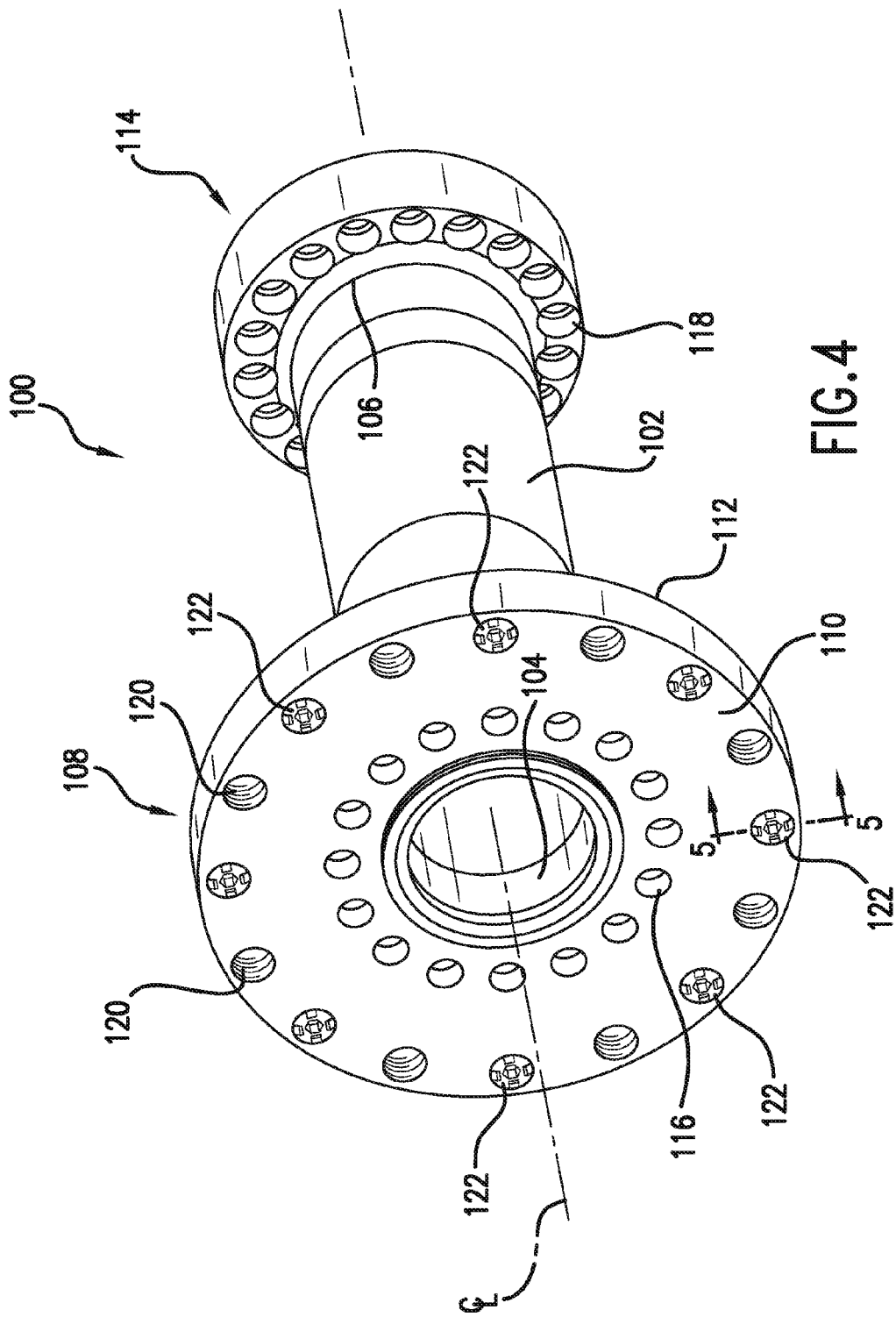
FIG. 4 is a perspective view of a load coupling in accordance with one embodiment of the present disclosure.

FIG. 3 provides a schematic of the power train 10 as illustrated in FIG. 1 including a load coupling 100 according to various embodiments of the present invention. It is intended that load coupling 100 replace the load coupling 16 shown in FIG. 1. FIG. 4 provides a perspective view of one embodiment of the load coupling 100 as shown in FIG. 3.

As shown in FIGS. 3 and 4, the load coupling 100 includes a shaft 102 having a first connecting end 104 that is axially separated from a second connecting end 106. A first connecting flange 108 extends radially outward from and circumferentially around the first connecting end 104. The first connecting flange 108 includes a first side 110 that is axially separated from a second side 112. A second connecting flange 114 extends radially outward from and circumferentially around the second connecting end 106. The shaft 102 axially separates the first connecting flange 108 from the second connecting flange 114. In particular embodiments, the first connecting flange 108 is radially oversized relative to the second connecting flange 114. As shown in FIG. 4, each of the first connecting flange 108 and the second connecting flange 114 respectfully include a plurality of annularly arranged connecting holes 116, 118.

In one embodiment, as shown in FIG. 3, the first connecting flange 108 is coupled to the connecting flange 24 of the torque driven device 14 via a plurality of bolts (not shown) or other fasteners that extend through the connecting holes 116 (FIG. 4) into the connecting flange 24. As shown in FIG. 3, the second connecting flange 114 is coupled to the connecting flange 22 of the torque producing device 12 via a plurality of bolts (not shown) or other fasteners that extend through the connecting holes 118 (FIG. 4) into the connecting flange 22. In alternate embodiments, the first connecting flange 108 may be coupled to the connecting flange 22 of the torque producing device 12 via a plurality of bolts (not shown) or other fasteners that extend through the connecting holes 116 (FIG. 4) into the connecting flange 22 and the second connecting flange 114 may be coupled to the connecting flange 24 of the torque driven device 14 via a plurality of bolts (not shown) or other fasteners that extend through the connecting holes 118 (FIG. 4) into the connecting flange 24.

In one embodiment, as shown in FIG. 4, a plurality of threaded bore holes 120 is defined within the first flange 108. The plurality of threaded bore holes 120 are annularly arranged radially outward from the plurality of connecting holes 116. The threaded bore holes 120 extend generally axially through the first flange 108.

Figure 5:
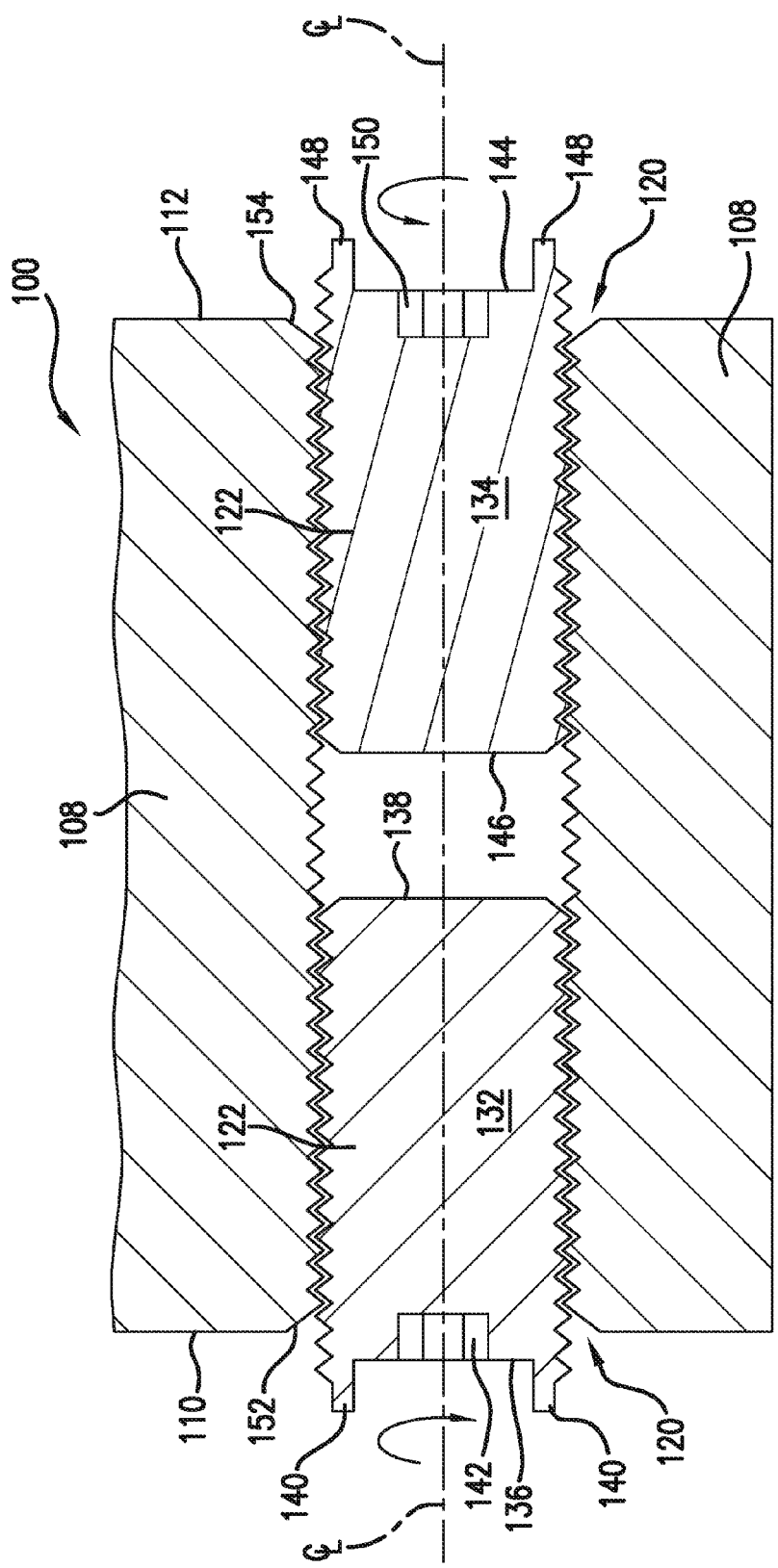
FIG. 5 is a side view of a portion of the load coupling as taken along lines 5-5 shown in FIG. 4 including a first threaded plug and a second threaded plug, according to one embodiment of the present disclosure.
Figure 6:
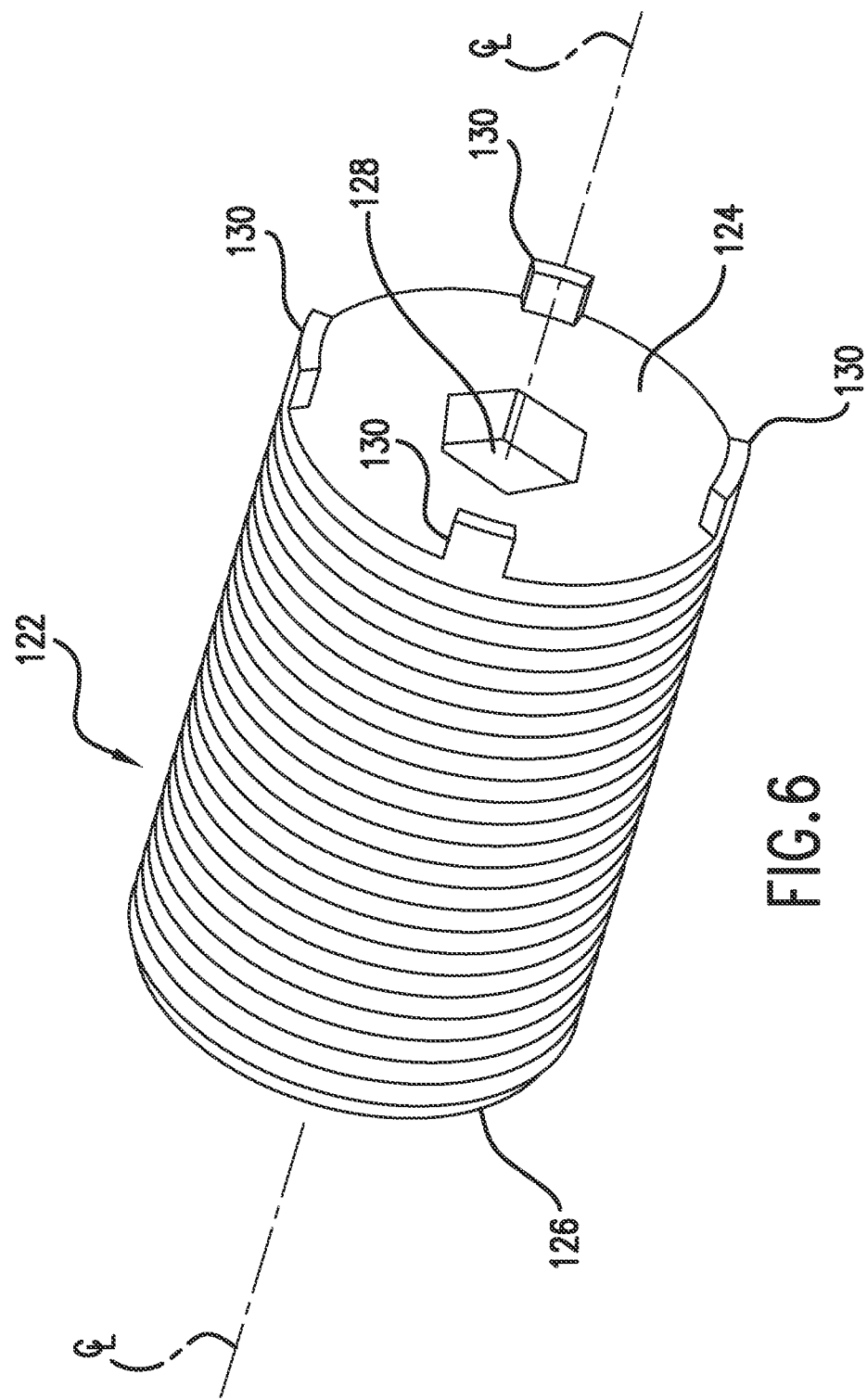
FIG. 6 is a perspective view of an exemplary threaded plug according to one embodiment of the present disclosure.

FIG. 5 provides a cross sectioned side view of an exemplary threaded bolt hole 120 of the plurality of bolt holes 120 as shown in FIG. 4 including a plurality of threaded plugs 122 seated within the threaded bore hole 120, according to at least one embodiment. FIG. 6 provides a perspective view of an exemplary threaded plug 122 according to at least one embodiment of the present disclosure. As shown in FIG. 6, the threaded plug 122 includes a turning end 124 axially separated from a contact end 126. The threaded plug 122 may at least partially define a turning feature 128 such as a hex slot disposed in the turning end 124. At least one locking tab 130 extends outwards from the turning end 124. For example, as shown the locking tab 130 may extend generally axially outward from the turning end 124 with respect to an axial centerline of the threaded plug 122. In one embodiment, the threaded plug 122 includes a plurality of the locking tabs 130 arranged annularly around the turning end 124. In particular embodiments, as shown in FIG. 4, each or some of the plurality of the bore holes 120 may include at least one threaded plug 122.

In one embodiment, as shown in FIG. 5, the plurality of threaded plugs 122 includes a first threaded plug 132 seated within the threaded bore hole 120, and a second threaded plug 134 seated within the same threaded bore hole 120. The first threaded plug 132 includes a turning end 136, a contact end 138 and at least one locking tab 140. In particular embodiments, a turning feature 142 is at least partially defined within the turning end 136 of the first threaded plug 132. The second threaded plug 134 includes a turning end 144, a contact end 146 and at least one locking tab 148. In particular embodiments, a turning feature 150 is at least partially defined within the turning end 144 of the second threaded plug 134. As shown in FIG. 5, the threaded bore hole 120 includes a first opening 152 defined along the first side 110 of the first connecting flange 108 and an opposing second opening 154 defined along the second side 112 of the first connecting flange 108.

In one embodiment, the first threaded plug 132 is seated within the threaded bore hole 120 by threading the first threaded plug 132 through the first opening 152. The second threaded plug 134 is seated within the threaded bore hole 120 by threading the second threaded plug 134 through the second opening 154. The first and second threaded plugs 132, 134 may be threaded by hand and/or by using a tool such as a torque wrench that engages with the turning feature 142, 150.

Figure 7:
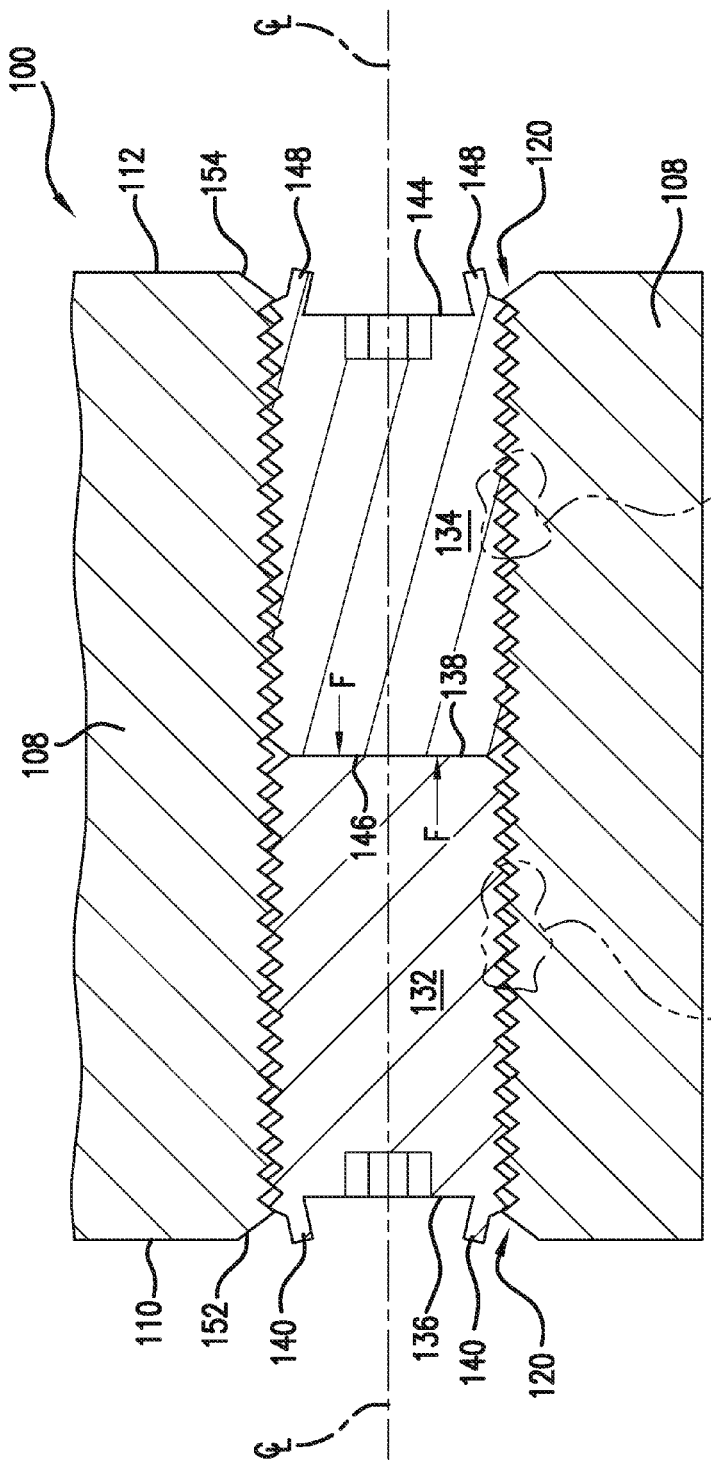
FIG. 7 is a side view of a portion of the load coupling as shown in FIG. 4, according to one embodiment of the present disclosure and FIGS. 7(a) and 7(b) provide enlarged views of portions the load coupling as shown in FIG. 7.

FIG. 7 provides a cross section side view of a portion of the first flange 108 as shown in FIG. 5, according to one embodiment of the present invention. As shown in FIG. 7, the first and second threaded plugs 132, 134 may be sized and/or positioned such that the respective turning ends 136, 144 are generally flush with the first and the second sides 110, 112 of the first flange 108 when fully seated within the bore hole 120. As a result, windage and/or noise normally resulting from an opening such as the threaded bore holes 120 disposed within the first flange 120 may be reduced and/or eliminated In one embodiment, as shown in FIG. 7, the first threaded plug 132 is threaded through the first opening 152 and into the threaded bore hole 120, and the second threaded plug 134 is threaded through the second opening 154 and into the threaded bore hole 120 until their respective contact surfaces 138, 146 meet or become engaged. Once engaged, as shown in FIG. 7 and as detailed in FIGS. 7(a) and 7(b), one or both of the first threaded plug 132 and/or the second threaded plug 134 may be turned or torqued so that the contact end 138 of the first threaded plug 132 provides an axial force or preload against the contact end 146 of the second threaded plug 134, thereby providing a preload 156 between threads 158 of the first threaded plug 132 and threads 160 of the threaded bore hole 120, and between threads 162 of the second threaded plug 134 and the threads 160 of the threaded bore hole 120. The preload 156 impedes the first and second threaded plugs 132, 134 from slipping or backing out of the threaded bore hole 120 during operation of the power train 10, thereby providing a first retention system for securing the threaded plugs 132, 134 in the first flange 108.

Figure 8:
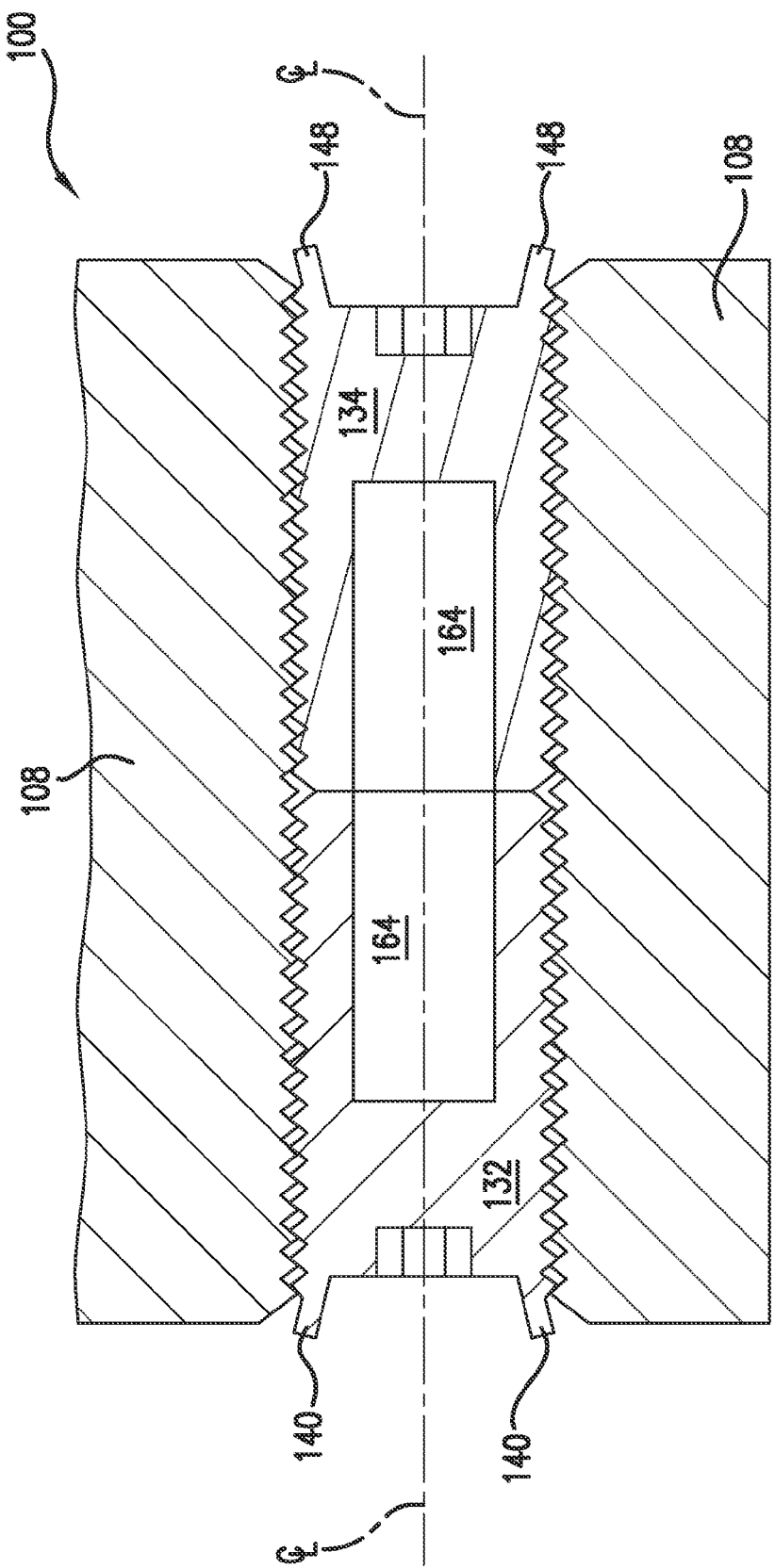
FIG. 8 is a side view of a portion of the load coupling as shown in FIG. 4, according to one embodiment of the present disclosure.

In particular embodiments, as shown in FIG. 7, at least one of the locking tabs 140 of the first threaded plug 132 are deformed so as to create an interference fit between the threads 158 of the first threaded plug 132 and the threads 160 of the threaded bore hole 120. In addition or in the alternative, at least one of the locking tabs 148 of the second threaded plug 134 are deformed so as to create an interference fit between the threads 162 of the second threaded plug 132 and the threads 160 of the threaded bore hole 120. The locking tabs 140, 148 may be deformed outward towards an axial centerline of the threaded plug 132, 134 or may be deformed inward respect to the axial centerline of the threaded plug 132, 134 as shown in FIG. 8. The deformation of the locking tabs 140, 148 may change the pitch of some of the threads 158, 162. This pitch modification advantageously reduces the ability of the first and second threaded plugs 132, 134 to rotate during operation. As a result, the locking tabs 140, 148 provide a second retention system for securing the threaded plugs 132, 134 in the first flange 108 during operation of the power train 10.

The use of the first and second threaded plugs 132, 134 may advantageously adjust the mass, and thus inertia, of the load coupling 100. The shift in the inertia may change the natural frequencies of the power train 10. A shift in the natural frequency may be intended to avoid the frequencies of torsional vibrations applied to or generated by the power train 10. The intended shift in the natural frequencies by adjusting the number of installed threaded plugs 122 and the weight of the installed threaded plugs 132, 134 should result in a power train 10 which does not experience excessive torsional vibration and has sufficient torsional frequency margin.

The first and second threaded plugs 132, 134 may have various densities as desired or required to adjust the natural frequency of the power train 10. For example, in some exemplary embodiments, the threaded plugs 132, 134 may be formed from tungsten, steel, aluminum, or titanium. Alternatively, however, any suitable materials are within the scope and spirit of the present disclosure. Further, it should be understood that the threaded plugs 132, 134 utilized in the load coupling 100 according to the present disclosure may have generally identical or different densities, as desired or required. In addition, as illustrated by lines 164 in FIG. 8, at least one of the first and second threaded plugs 132, 134 may be at least partially hollowed out so as to affect the weight thereof, thereby providing greater frequency control.

Figure 9:
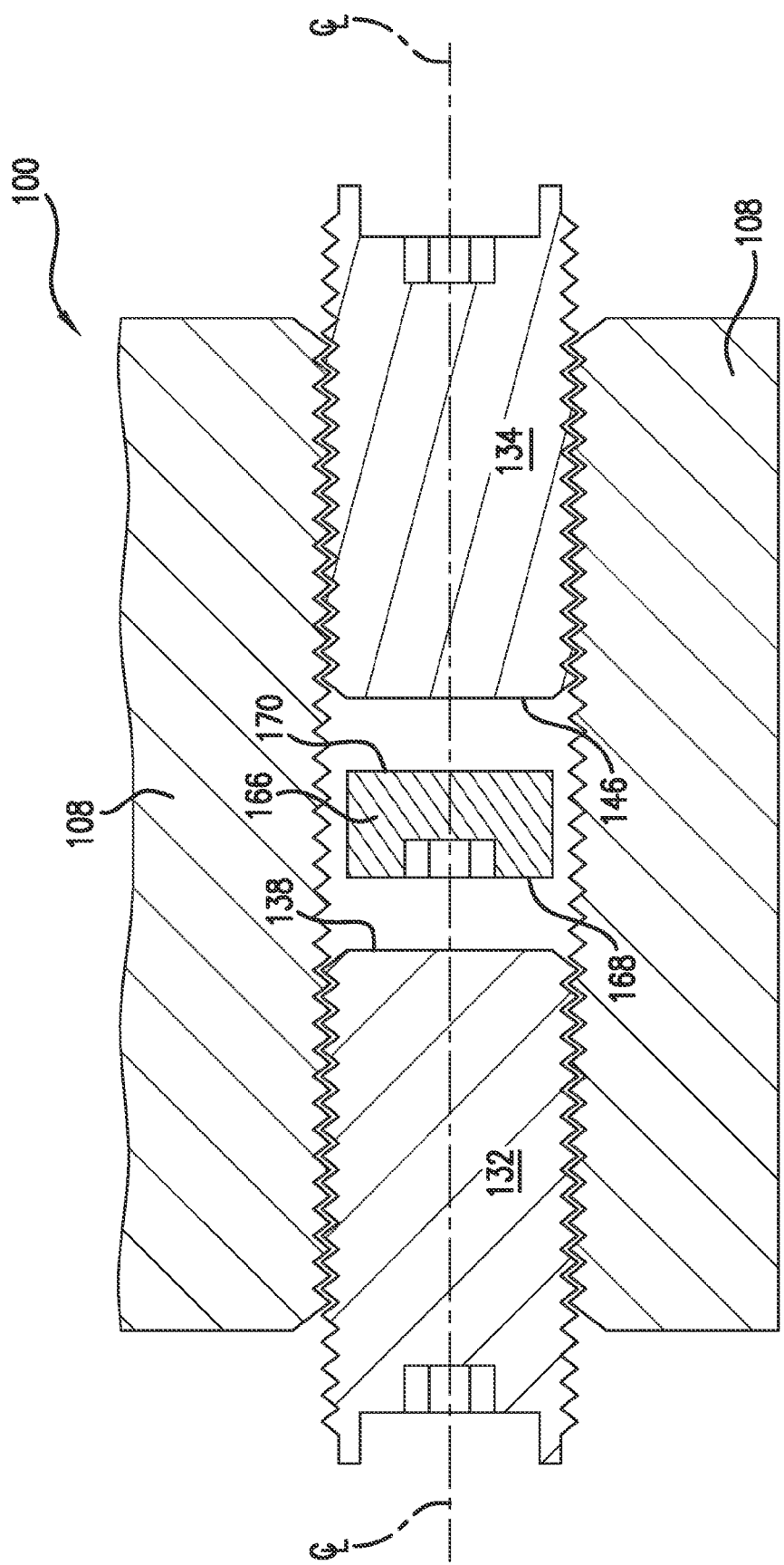
FIG. 9 is a side view of a portion of the load coupling as shown in FIG. 4 including an intermediate plug disposed between the first threaded plug and the second threaded plug, according to one embodiment of the present disclosure.
Figure 10:
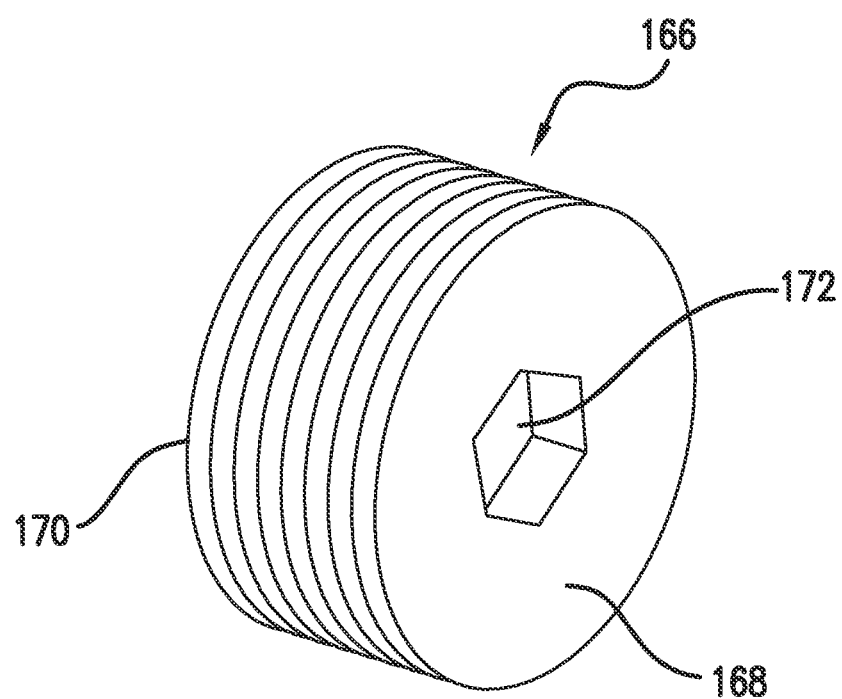
FIG. 10 is a is a perspective view of an exemplary intermediate plug according to one embodiment of the present disclosure.

In one embodiment, as shown in FIG. 9, an intermediate plug 166 is disposed within the threaded bore hole 120 between the respective contact ends 138, 146 of the first and second threaded plugs 132, 134. FIG. 10 provides a perspective view of an exemplary intermediate plug 166. As shown in FIGS. 9 and 10, the intermediate plug 166 includes a first reaction surface 168 and a second reaction surface 170. The intermediate plug 166 may be threaded as shown in FIG. 10 or may be non-threaded as shown in FIG. 9. The intermediate plug 166 may at least partially define a hollowed out portion 172. The hollowed out portion may at least partially define a turning feature such as a hex shaped slot disposed in either or both of the first and second reaction surfaces 168, 170.

Figure 11:
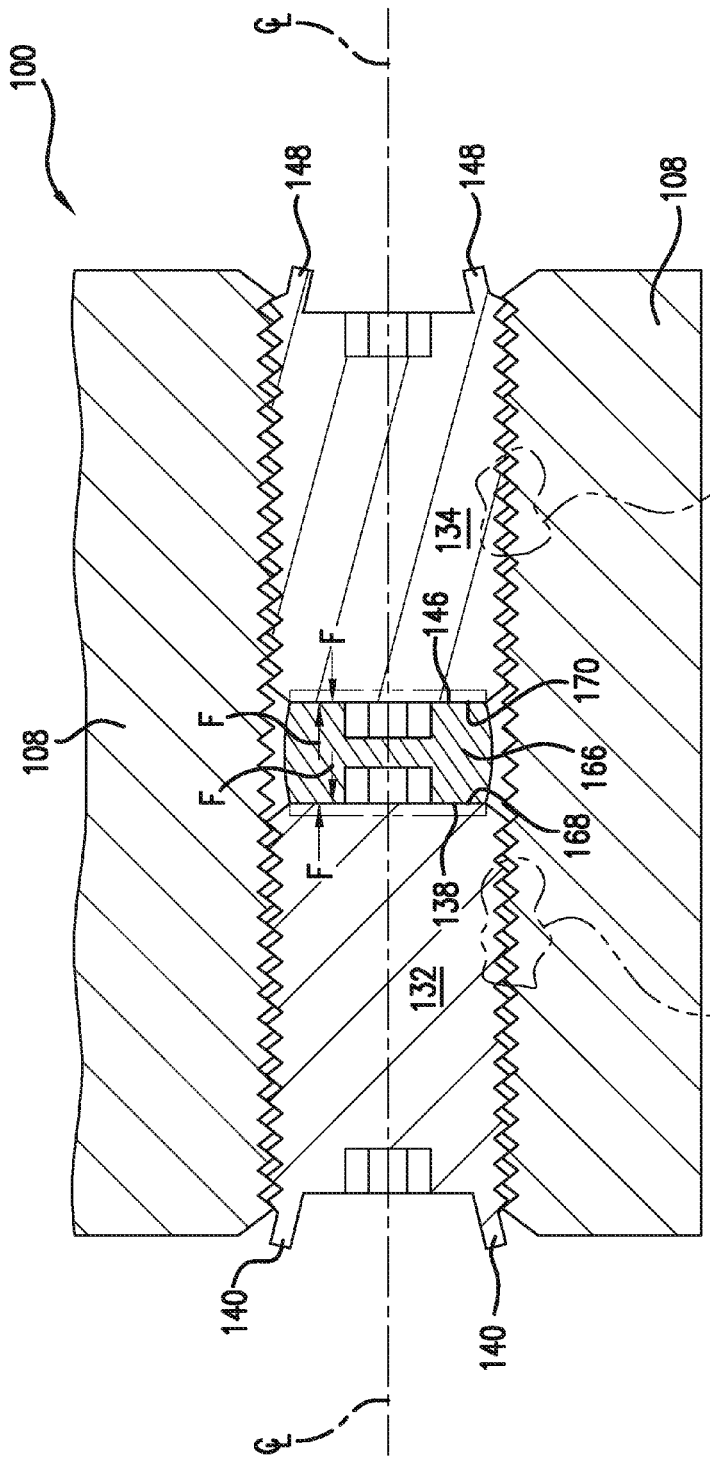
FIG. 11 is a side view of a portion of the load coupling as shown in FIG. 9, according to one embodiment of the present disclosure and FIGS. 11(a) and 11(b) provide enlarged views of portions the load coupling as shown in FIG. 9.

As shown in FIG. 11, the first and second threaded plugs 132, 134 are threaded into the threaded bore hole 120 until their respective contact ends 138, 146 meet or become engaged with a respective reaction surface 168, 170 of the intermediate plug 166. For example, the first contact end 138 becomes engaged with the first reaction surface 168 and the second contact end 146 becomes engaged with the second reaction surface 170.

Figure 11B:
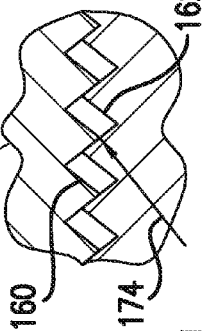
Figure 11A:
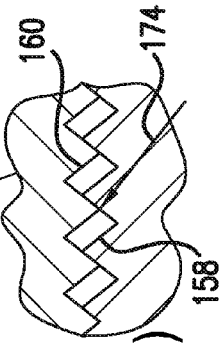

Once engaged, as shown in FIG. 11 and as detailed in FIGS. 11(a) and 11(b), one or both of the first threaded plug 132 and/or the second threaded plug 134 may be turned or torqued so that the contact end 138 of the first threaded plug 132 is axially loaded in one direction against the first reaction surface 168 of the intermediate plug 166 and the contact end 146 of the second threaded plug 134 is axially loaded against the second reaction surface 170 of the intermediate plug 166 in an opposite axial direction. As a result, a preload 174 is provided between the threads 158 of the first threaded plug 132 and the threads 160 of the threaded bore hole 120, and between the threads 162 of the second threaded plug 134 and the threads 160 of the threaded bore hole 120. The preload 174 impedes the first and second threaded plugs 132, 134 from slipping or backing out of the threaded bore hole 120 during operation of the power train 10, thereby providing a first retention system for securing the threaded plugs 132, 134 in the first flange 108. The intermediate plug 166 provides for greater flexibility when fine tuning the natural frequency of the load coupling 100.

At least one of the locking tabs 140 of the first threaded plug 132 are deformed so as to create an interference fit between the threads 158 of the first threaded plug 132 and the threads 160 of the threaded bore hole 120. In addition or in the alternative, at least one of the locking tabs 148 of the second threaded plug 134 are deformed so as to create an interference fit between the threads 162 of the second threaded plug 134 and the threads 160 of the threaded bore hole 120. The deformation of the locking tabs 140, 148 may change the pitch of some of the threads 158, 162. This pitch modification advantageously reduces the ability of the first and second threaded plugs 132, 134 to rotate during operation. As a result, the locking tabs 140, 148 provide a second retention system for securing the threaded plugs 132, 134 in the first flange 108 during operation of the power train 10.

The intermediate plug 166 may have a similar or different density as the first and/or the second threaded plugs 132, 134 in order to adjust the natural frequency of the power train 10 as desired. For example, in some exemplary embodiments, the intermediate plugs 166 may be formed from tungsten, steel, aluminum, or titanium. In one embodiment, the intermediate plug 166 is formed from a material having elastic properties. It should be understood that the intermediate plugs 166 utilized in the load coupling 100 according to the present disclosure may have generally identical or different densities, as desired or required.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A load coupling comprising;
   a. a first flange having a plurality of annularly arranged connecting holes;
   b. a second flange having a plurality of annularly arranged connecting holes;
   c. a shaft that extends axially between the first flange and the second flange;
   d. a threaded bore hole defined within the first flange, said threaded bore hole being disposed radially outward from the plurality of connecting holes;
   e. a first threaded plug seated within the threaded bore hole, the first threaded plug having a turning end axially separated from a contact end;
   f. a second threaded plug seated within the threaded bore hole, the second threaded plug having a turning end axially separated from a contact end; and
   g. wherein the contact end of the first threaded plug is axially loaded against the contact end of the second threaded plug to provide a preload between threads of the first and second threaded plugs and threads of the threaded bore hole and wherein the threaded bore hole comprises a first opening and an opposing second opening, the turning end of the first threaded plug being substantially flush with the first opening and the turning end of the second threaded plug being substantially flush with the second opening.

2. The load coupling as in claim 1, wherein the first threaded plug at least partially defines at least one locking tab that extends outwardly from the turning end.

3. The load coupling as in claim 2, wherein the locking tab is deformed to create an interference fit between threads of the first threaded plug and threads of the threaded bore hole.

4. The load coupling as in claim 1, wherein the second threaded plug at least partially defines at least one locking tab that extends outwardly from the turning end.

5. The load coupling as in claim 4, wherein the locking tab is deformed to create an interference fit between threads of the second threaded plug and threads of the threaded bore hole.

6. The load coupling as in claim 1, wherein at least one of the first threaded plug and the second threaded plug defines a hollowed out portion.

7. The load coupling as in claim 1, wherein at least one of the first threaded plug and the second threaded plug includes a turning feature defined in the corresponding turning end.

8. A power train comprising:
   a. a torque producing power source including a connecting flange;
   b. a torque driven power load including a connecting flange; and
   c. a load coupling, the load coupling comprising:
      i. a shaft having a first flange that extends radially outward from a first end of the shaft and a second flange that extends radially outward from a second end of the shaft, wherein each of the first flange and the second flange include a plurality of annularly arranged connecting holes;
      ii. a plurality of threaded bore holes defined within one of the first flange or the second flange radially outward from the plurality of connecting holes;
      iii. a first threaded plug and a second threaded plug seated within one bore hole of the plurality of bore holes, each threaded plug having a turning end axially separated from a contact end; and
      iv. wherein the contact end of the first threaded plug provides an axial force to the contact end of the second threaded plug to provide a preload between threads of the first and second threaded plugs and threads of the threaded bore hole and wherein the threaded bore hole comprises a first opening and an opposing second opening, the turning end of the first threaded plug being substantially flush with the first opening and the turning end of the second threaded plug being substantially flush with the second opening.

9. The power train as in claim 8, wherein each of the first threaded plug and the second threaded plug at least partially defines at least one locking tab that extends outwardly from the corresponding turning end, wherein the locking tabs are deformed to create an interference fit between threads of the threaded bore hole and threads of the first threaded plug and threads of the second threaded plug.

10. The load coupling as in claim 8, further comprising an intermediate plug disposed between the contact end of the first threaded plug and the contact end of the second threaded plug, wherein the axial force is transferred between the contact end of the first threaded plug and the contact end of the second threaded plug via the intermediate plug.

11. The load coupling as in claim 8, wherein at least one of the first threaded plug and the second threaded plug defines a hollowed out portion.

\* \* \* \* \*